E. C. FRAZER.
MACHINE FOR CUTTING AND PUNCHING SHEET METAL.
No. 31,380. Patented Feb. 12, 1861.
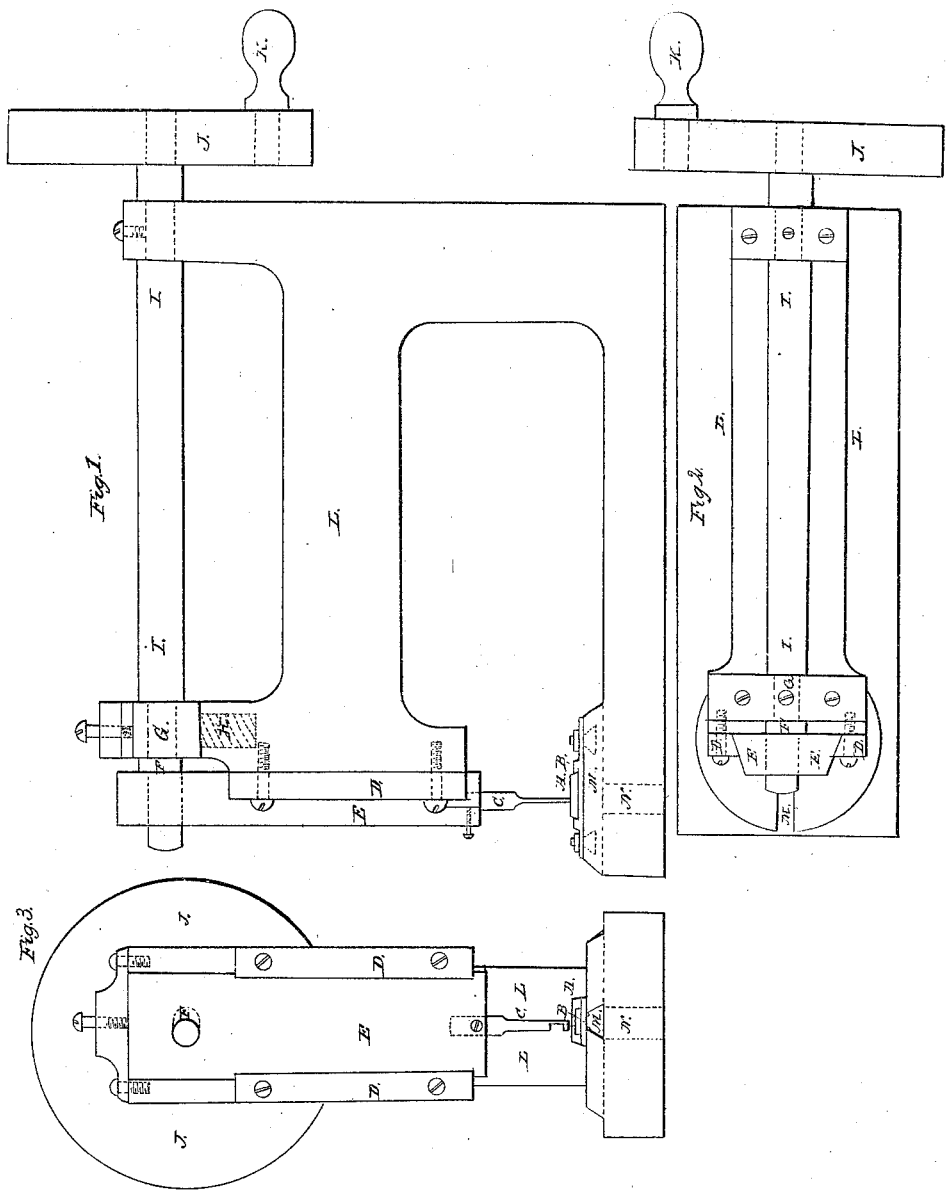

UNITED STATES PATENT OFFICE.

E. C. FRAZER, OF NEW YORK, N. Y.

MACHINE FOR CUTTING AND PUNCHING SHEET METAL.

Specification of Letters Patent No. 31,380, dated February 12, 1861.

*To all whom it may concern:*

Be it known that I, E. C. FRAZER, of the city, county, and State of New York, have invented a new and useful Machine for Cutting Devices in Brass and Copper Plate; and I do hereby declare that the following is a full, clear, and exact description of the construction and operation of the same, reference being had to the annexed drawings, making a part of this specification, in which—

Figure 1 is a perspective view, Fig. 2 longitudinal and Fig. 3 transverse.

Letter A is a die.

B is a self adjuster for die A.

C is the cutting-tool passing through the die A.

D is the slide on either side of plunger E.

F is the crank working plunger, G the journal movable by means of a screw in the top, H a spring underneath.

I is the shaft, J the balance wheel, K the main crank, L the frame work of the machine.

M is the groove in which the die A is affixed, and by means of two small bolts adjusted.

N is the opening or clearance for the cuttings.

To work the machine the crank F, should be placed on the upper center and the shaft I raised by means of the middle screw, immediately over spring H, sufficient to admit the plate. The plate should be placed under the cutting-tool C, to the part having the design marked upon it. The point of the tool should then be forced through the plate by means of the center screw in the top, over spring H, sufficient to keep the point of the tool in the mortise of the die A, while cutting. The tool is to be raised for every new incision by means of the middle screw over the spring H.

This machine has an advantage over all other means (that I am aware of) of forming devices in brass and copper plate as it requires little or no filing and does not stretch or pucker the plate, and the facilities are much greater in performance of the work. It is intended to be worked with a treadle. The die and cutting tool are of hardened steel and being self adjusting will admit of any shaped tool for borders, patterns &c.

I claim—

The application of the tool C constructed with a neck as described for punching and cutting sheet metal in combination with the adjustable die and die bed, A, B, as herein set forth.

E. C. FRAZER.

Witnesses:
CHARLES STEVENS,
WILLIAM WRIGHT.